A. HICKS.
Liquid Measure.
No. 41,620.
Patented Feb. 16, 1864.
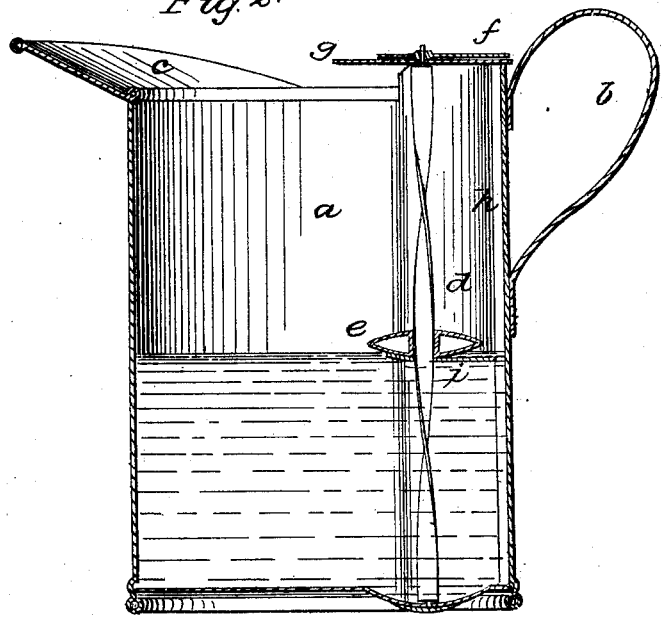
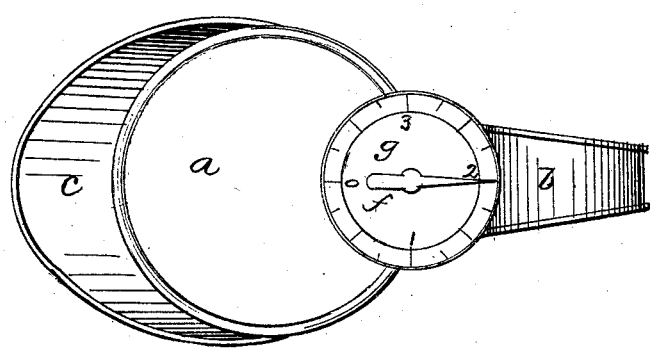
Witnesses
Lemuel W Serrell
Chas. H. Smith
Inventor
Alonzo Hicks

UNITED STATES PATENT OFFICE.

ALONZO HICKS, OF FLUSHING, NEW YORK.

IMPROVEMENT IN LIQUID-MEASURES.

Specification forming part of Letters Patent No. 41,620, dated February 16, 1864.

*To all whom it may concern:*

Be it known that I, ALONZO HICKS, of Flushing, in the county of Queens and State of New York, have invented, made, and applied to use a certain new and useful Improvement in Liquid-Measures; and I do hereby declare the following to be a full, clear, and exact description of the said invention, reference being had to the annexed drawings, making part of this specification, wherein—

Figure 1 is a plan, and Fig. 2 is a vertical section, of the said improved measure.

Similar marks of reference denote the same parts.

Measures have heretofore been made with a float to determine the height of liquid.

My said invention consists in a twisted rod, in combination with a float and index, in such a manner that the index is caused to revolve by the twisted rod as acted upon by the rising or lowering of the float. By this device the parts can all be kept within the measure out of the way of injury, and an accurate measure is obtained in one vessel of any subdivisions of that measure—such as gills, pints, or quarts in a gallon or half-gallon measure.

In the drawings, $a$ is a measure of suitable size and shape provided with the handle $b$ and lip $c$. $d$ is a flat metallic strip extending from top to bottom of the measure, twisted to form a steep incline or screw-form, the edge of the strip at one end being directly in the vertical line of the same edge at the other end, so that the float $e$ in passing from end to end of this metallic strip shall give it one complete or nearly complete rotation. The strip itself is formed with centers or arbors at its end, on which it is free to be turned, and the upper arbor is fitted with a hand, $f$, attached in any convenient manner.

$g$ is a dial contiguous to the hand $f$, and on which dial-divisions are marked corresponding to the integral parts of the measure. The float is guided so as to go up and down vertically, without turning, by a small fork at $i$, taking on the sides of a stationary vertical bar, $h$. It will now be seen that the liquid allowed to run into the measure will float and gradually raise the float $e$ and give to the hand a complete rotation when filled, the half, quarter, or other capacity of measure contained in such vessel being determined by the inspection of said dial, so that any desired amount less than the capacity of the vessel can be measured in the same.

What I claim, and desire to secure by Letters Patent, is—

The twisted rod $d$ and float $e$, fitted as specified, in combination with a dial or index and vessel to contain the fluid to be measured, as set forth.

In witness whereof I have hereunto set my signature this 4th day of December, 1863.

ALONZO HICKS.

Witnesses:
LEMUEL W. SERRELL.
CHAS. H. SMITH.